Sept. 11, 1923.
R. RIEGE
CONTROLLING INTERNAL COMBUSTION ENGINES
Filed Feb. 28, 1917    4 Sheets-Sheet 4
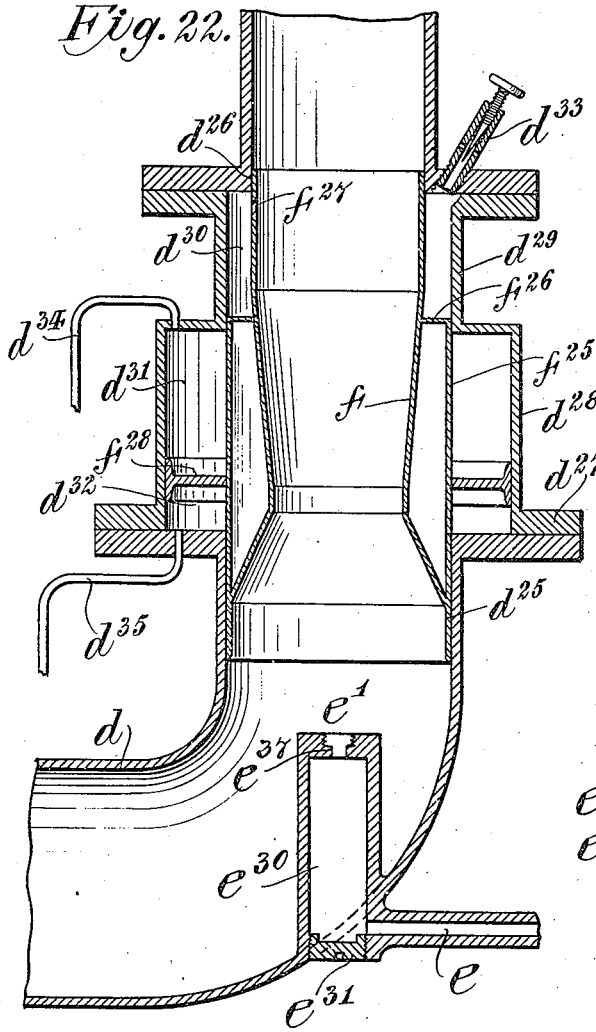
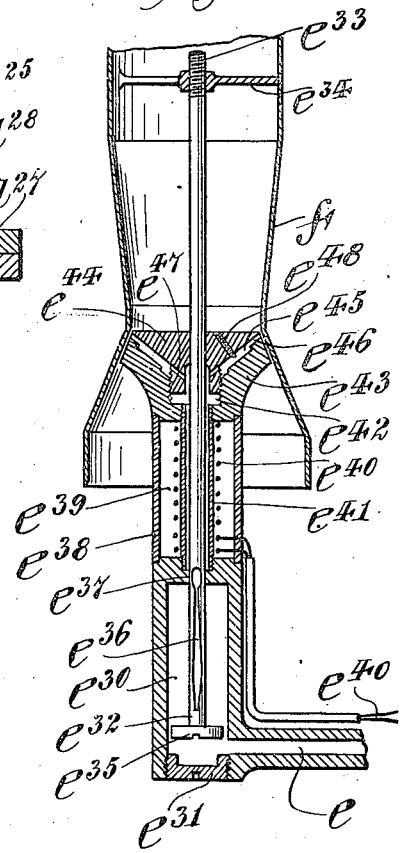

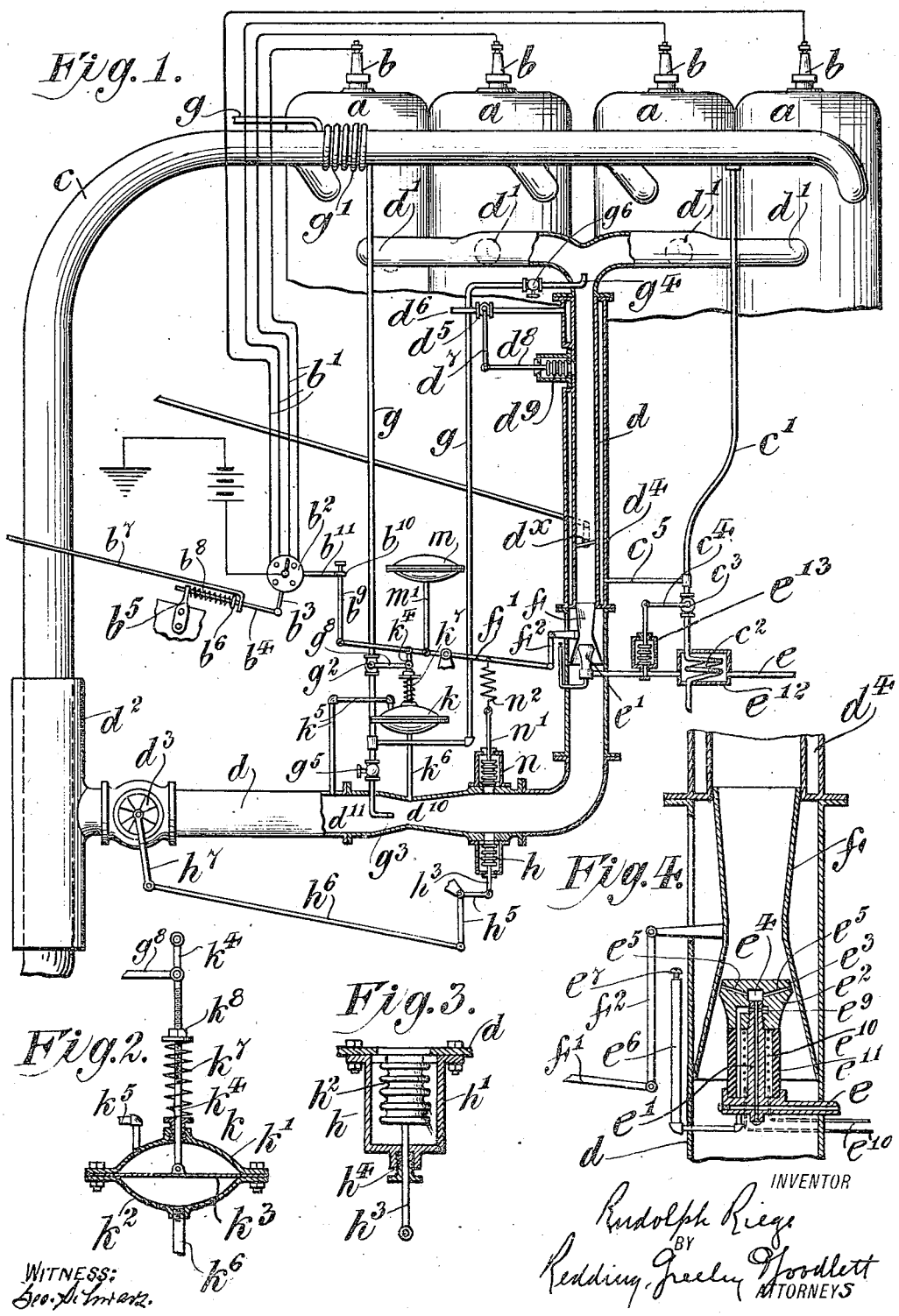

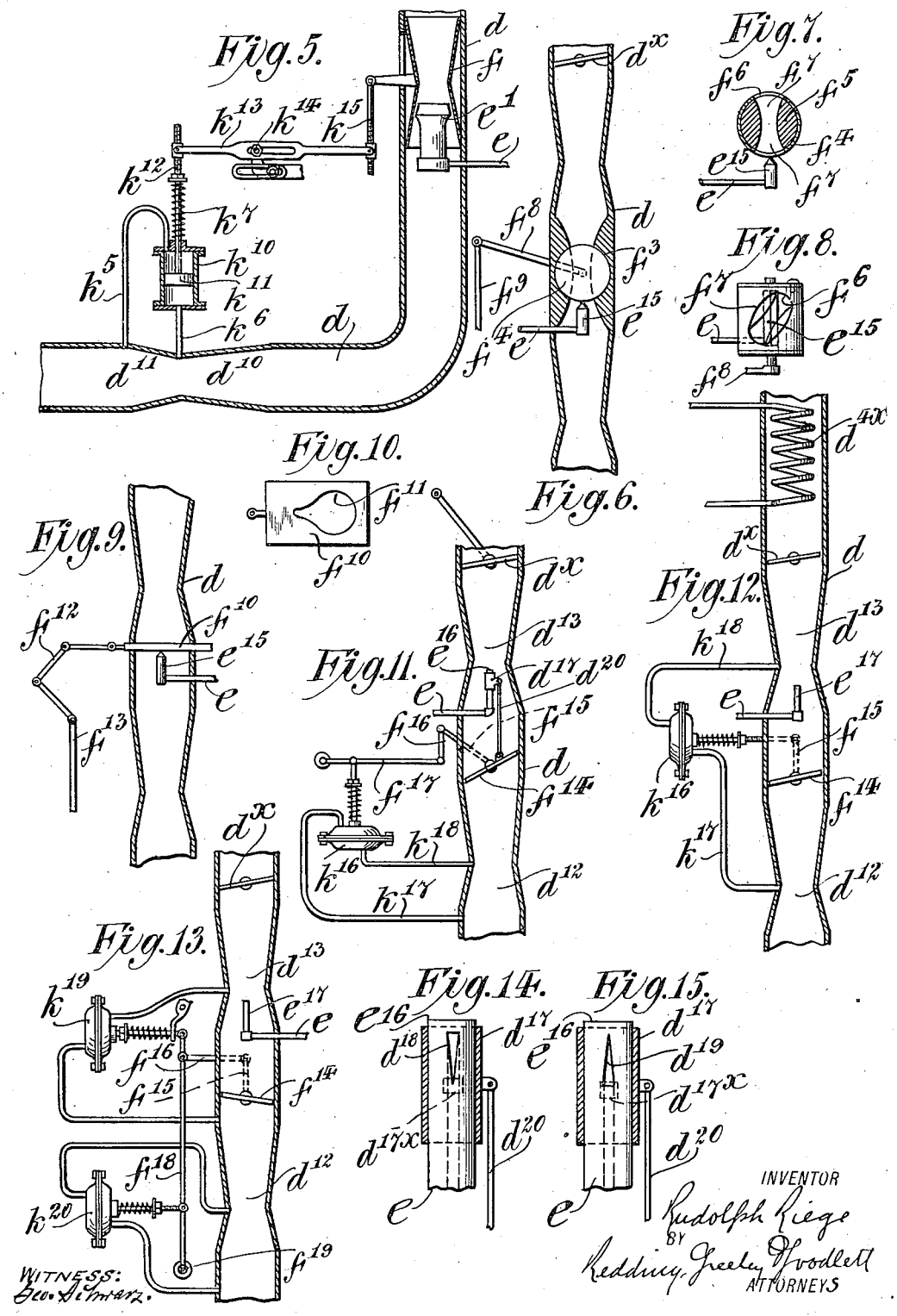

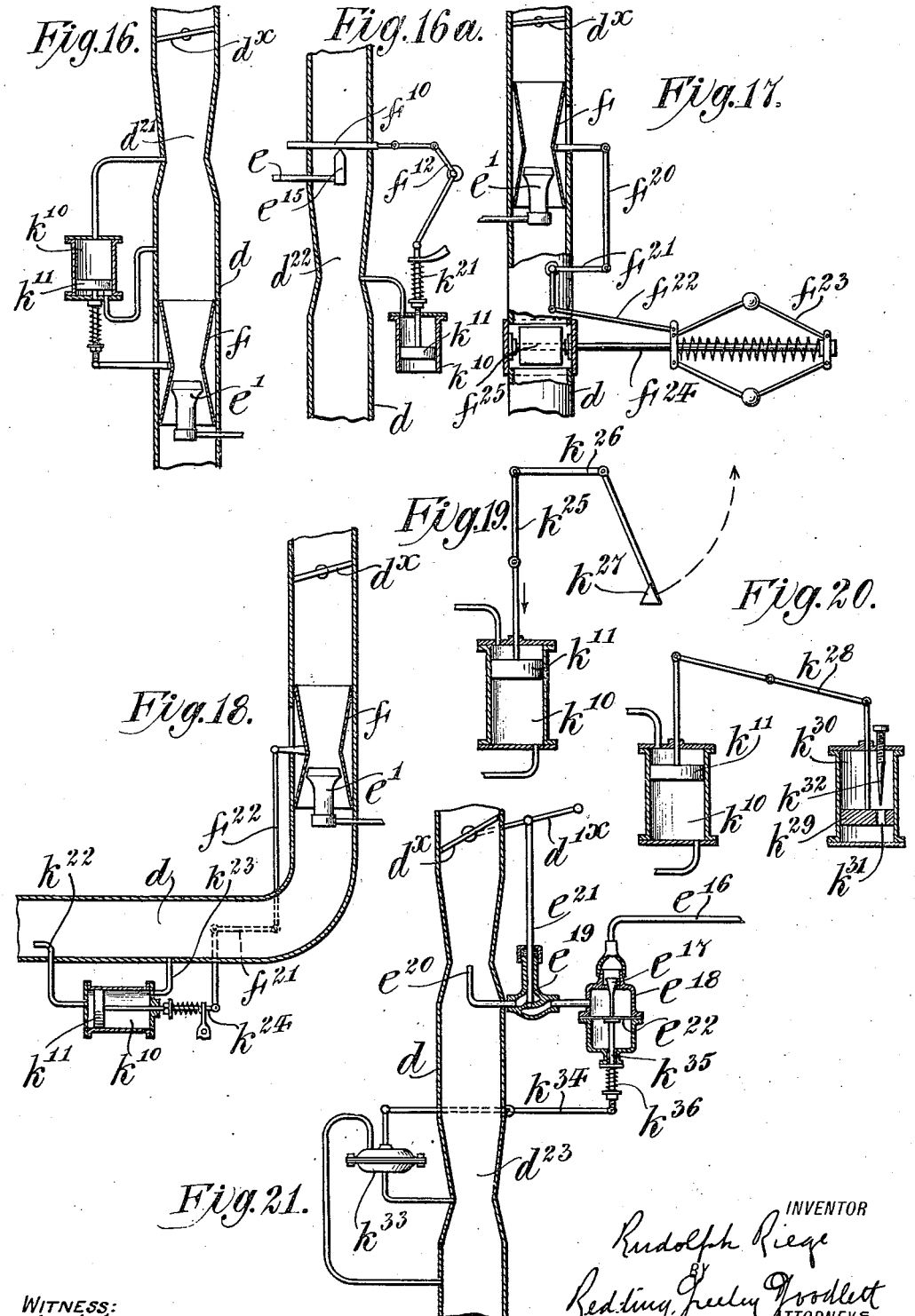

Patented Sept. 11, 1923.

1,467,333

UNITED STATES PATENT OFFICE.

RUDOLPH RIEGE, OF MONTCLAIR, NEW JERSEY.

CONTROLLING INTERNAL-COMBUSTION ENGINES.

Application filed February 28, 1917. Serial No. 151,451.

*To all whom it may concern:*

Be it known that I, RUDOLPH RIEGE, a citizen of the United States, and residing in Montclair, county of Essex, in the State of New Jersey, have invented certain new and useful Improvements in Controlling Internal-Combustion Engines, of which the following is a specification, reference being had to the accompanying drawings, forming a part hereof.

This invention relates to the control of internal combustion engines using either a liquid or gaseous fuel in combination with a combustion supporting gas. As the combustion supporting gas commonly used is air, this term will for simplicity be hereafter used in this specification although it is understood the invention is not to be limited thereto.

The object of the invention is to provide for proportioning and mixing air and a fuel whereby the desired proportions by weight of air and fuel may be automatically obtained at all engine speeds, under varying barometric and temperature conditions, and whereby the correct timing of ignition to secure the maximum efficiency is automatically obtained under varying conditions of speed and charge; to unite these various elements of control so that all may be governed as a unit by a single factor, and generally to provide for a more efficient automatic control.

In the practice of the invention the energy of flow of the air through a measuring device is converted in part to mechanical movement of an actuating mechanism by means of which mechanism the quantity of fuel delivered and the time of ignition of the charge are controlled as some function of the quantity of air flowing through the measuring device. The invention further comprises means for securing the desired ratio of weight of fuel to weight of air by automatically controlling the temperature of the air and of the fuel delivered to the mixing device, and varying the volume of air supplied in accordance with its temperature. The invention further comprises means for modifying the movement of the actuating mechanism and for modifying the rate of supply of water vapor to the mixture in accordance with barometric conditions. The invention further comprises means for preventing condensation or precipitation of the fuel from the mixture (between the point of mixing and the combustion chamber) by automatically controlling the temperature of the mixture from the point of its production to the combustion chamber.

It is usual in engines of this type to provide a mixing device such as a carbureter, in which the fuel and air are mixed, the relative volumes of each passing through the carbureter being controlled by a difference of pressure, or a head, produced by the engine suction. In engines using a liquid fuel it has been impossible heretofore, it is believed, to provide a mixture of the desired proportions weight for weight of air and fuel under all speed conditions, owing, first, to the difference in the laws controlling the flow of gases and liquids through orifices, by reason of which an increase of head does not produce a proportionate increase in the quantity of flow of air and fuel; and, second, because of the variations in density of air with temperature variation; and, third, because of the variation in the weight of fuel vapor that will be absorbed by air under varying temperatures of the air and fuel.

Many attempts have been made to overcome the first difficulty, which is common to all carbureters, as by providing auxiliary air valves which open a secondary air supply when the engine has reached a predetermined speed, or by having a plurality of fuel and air orifices which are successively opened and give a step by step result. By multiplying the number of such individual carbureters an approximation to the desired proportioning for varying speeds is reached, but as each of these individual carbureters is subject to the difficulty above mentioned the total result is not satisfactory.

In this invention this difficulty is overcome by passing all the air through a measuring device or meter and causing the flow through the meter to actuate mechanism controlling the flow of fuel, either liquid or gaseous. This actuating mechanism may be proportioned or designed to maintain a constant ratio of fuel to air, or gradually to decrease the proportion of fuel as the speed of the engine increases if so desired.

In some internal combustion engines the time of ignition is varied by a governor controlled by the speed of the engine, and may be subject to modification by hand. Maximum efficiency is not obtained with this speed governor control, because engine speed may remain constant under varying loads and varying positions of the throttle, while the character or proportions and volume of the charge will vary. For maximum efficiency the timing of ignition should vary with such variations in the charge, and a further feature of this invention provides for varying the time of ignition with variations in proportion and volume of charge.

The weight of a unit volume of air varies with the temperature, so that the weight of oxygen contained in a unit volume of air will decrease with temperature increase, and it is essential to proportion the fuel and air by weight instead of by volume if uniformity is to be obtained. It is also well known that the weight of a vapor of liquid such as water or gasoline that will be absorbed by a unit volume of air varies with the temperature. A cubic foot of air will absorb about 1.90 cubic inches of gasoline vapor at a temperature of 40° F. and about 11.20 cubic inches at a temperature of 100° F. or nearly six times as much as at 40° F. This range of temperatures may easily be met with in practice, in summer and winter weather. It is also true that hot air will absorb and carry more vapor than will cold air, and while the amount of fuel vapor carried by the air into the combustion chamber of the engine may possibly at no time approach saturation, the necessity of controlling the temperature of the fuel and air is obvious. Many of the carbureters now in use have means for heating the air or the fuel, or both, but so far as known no attempt has heretofore been made to control the temperature and maintain it constant at a desired point, under different speed conditions or under different atmospheric temperature conditions, the result being that a carbureter adjusted under one set of temperature conditions will not provide the same proportions of fuel and air under the varying temperature conditions met with in practice, and one of the features of this invention is to maintain uniformity of temperature of the air or of the fuel or of both, by means of thermostats controlling the supply of heat to the ingredients of the mixture, and a further feature of the invention is to provide compensation for variation in density of the air due to temperature change in the air supplied to the mixing device when starting the engine, or in extremely cold weather, by means of a thermostatic controlling device acting to modify the movement of the actuating mechanism.

As the weight of a cubic foot of air will vary with barometric changes, and notably with changes in altitude, the ratio by weight of fuel to oxygen in the air will also vary, and it is well known that carbureters on automobile engines need readjustment for altitude changes, such as are met with in mountain climbing, and the same will be true to a larger extent in flying machines. This invention provides compensation for these changes by means of a device operated by barometric pressure, which may be connected to the actuating mechanism before mentioned or may operate in any other desired manner, to modify the movements of the actuating mechanism.

It has been found advisable and with some liquid fuels, such as kerosene, essential to provide for the presence of water vapor in the mixture in order to secure continued economical running of the engine, and it has been found necessary with some carbureters in use on automobile engines, to readjust the carbureter when the car is in use at the seashore where there is relatively a greater amount of moisture in the air than is found under normal conditions inland. A further feature of this invention provides for the supply of water vapor to the mixture when required, and for varying the amount of such water vapor content of the mixture by barometric control.

Provision is also made, in accordance with the invention, whereby, through a ready adjustment of the pressure regulating valve, the mixture of fuel-gas and air may be changed in accordance with changes in the character of fuel used, as from gasoline to kerosene, a lead or lag, as required, being thus secured.

In carrying out this invention any preferred form of air meter and any desired form of actuating mechanism may be used, and for the better understanding of the invention several types of air meter and a number of alternative forms of actuating mechanism will be herein described as applied to the invention.

One form of meter which may be used is of the venturi type in which as is well known the flow of air through the Venturi tube results in the creation of a pressure difference, the pressure at the throat being less than the pressure at the inlet, and the pressure difference or head will vary approximately as the square of the velocity, or substantially as the square of the quantity of air flowing through the meter, and in using this type of meter as applied to the invention, the energy of the air flowing through the meter is converted in part to move actuating mechanism of any desired form by means of this pressure difference or head.

Another form of measuring device employing the same principle, is a straight pipe in which is inserted an impact tube and a static tube. The flow of air through such a pipe causes a difference of pressure in the two tubes, and this pressure difference or head varies substantially as the square of the velocity of the air, and in using this type of meter this varying pressure difference created by the energy of flow of air through the pipe is used to move any desired type of actuating mechanism.

Another form of meter adapted for use in this invention is of the rotary type, and in using this form of meter, the rotation of the parts by the air flowing through the meter is converted into movement of any desired form of actuating mechanism.

As is well understood, the quantity of fuel flowing through the fuel orifice of a carbureter varies with variations in the head acting on the fuel, and in certain types of carbureters it is attempted to maintain this head constant or nearly so, and to control the quantity of fuel delivered by varying the size or the number of fuel orifices, while in other types of carbureters the size of the fuel orifice remains constant, and the head acting on the fuel is varied. In still other forms of carbureters a combination of these two methods is used. Any one of these methods may be used in carrying out this invention, and each will later be described, with alternative constructions.

For maintaining a constant or nearly constant pressure at the fuel orifice, which is substantially the same as maintaining a constant or nearly constant head on the fuel, a pressure regulating valve of any desired type may be used, which by its position either throttles the inlet of the passage leading to the mixing tube in which the fuel orifice is positioned and modifies the pressure produced by the suction of the engine at the fuel orifice, or by its position modifies the area of the mixing tube passage at the place where the fuel orifice is located, to give an area at this point varying with the quantity of air flowing through the mixing tube. These same valves may be operated and their movement so controlled as to give a varying pressure at the fuel orifice instead of maintaining a substantially constant pressure, and the varying pressure maintained as some function of the quantity of air flowing which will give the desired fuel flow, and either of these methods of operation may be combined with a variable area of fuel orifice.

For the accomplishment of the above purposes and for accomplishing other objects of the invention which will appear from the following description, the invention consists in certain novel features, all as hereinafter described and specifically pointed out in the claims.

The accompanying drawings illustrate more or less in outline and diagrammatically several ways of practicing the invention, and several embodiments of apparatus features of the invention.

In the drawings:

Figure 1 is a view, partly in outline and partly in section and for convenience somewhat exaggerated as to the relations of some of the parts, illustrating the application of the invention to an internal combustion engine, one convenient embodiment of each of the several features of the invention being illustrated.

Figure 2 is a detail view, on a larger scale, of one of the pressure differential devices shown in Figure 1.

Figure 3 is a detail view, on a larger scale, of one of the thermostatic devices shown in Figure 1.

Figure 4 is a detail view, on a larger scale, of the pressure regulating valve and mixing device shown in Figure 1.

Figure 5 is a partial view illustrating particularly a cylinder-and-piston pressure differential controller, which may be substituted for the diaphragm controller shown in Figures 1 and 2.

Figure 6 is a detail view illustrating a rotary pressure regulating valve which may be substituted for the sliding venturi shown in Figures 1, 4 and 5.

Figure 7 is a detail view, in section, of the regulating valve and fuel nozzle shown in Figure 6.

Figure 8 is a top view of the valve and fuel nozzle shown in Figure 6.

Figure 9 is a detail view illustrating a transverse sliding pressure regulating valve.

Figure 10 is a top view of the slide-valve shown in Figure 9.

Figure 11 is a detail view showing a pressure regulating device with a choke valve controlled by the diaphragm controller.

Figures 12 and 13 are detail views showing a pressure regulating device of the general character of that shown in Figure 11 but with a differential pressure device differently connected to the supply pipe.

Figures 14 and 15 are detail views showing different kinds of fuel-inlet controlling devices for use as indicated in Figure 11.

Figure 16 is a detail view showing a cylinder-and-piston controller for a sliding venturi subject to the pressure of the mixture, rather than to the pressure of the air before it reaches the pressure regulating device.

Figure 16ᵃ is a detail view showing a cylinder and piston controller connected to the throat only of a venturi and operating on a sliding valve similar to that shown in Figures 9 and 10.

Figure 17 is a detail view showing a fan measuring device controlling a sliding venturi through a centrifugal governor.

Figure 18 is a detail view showing a cylinder-and-piston controller for a sliding venturi operated through the differential of impact and static pressure in the air pipe.

Figures 19 and 20 are detail views illustrating different forms of yielding resistance devices which may be substituted for the yielding resistance device shown in Figure 1.

Figure 21 is a detail view showing an application of the invention when the fuel is supplied under pressure.

Figure 22 is a view showing an application of the invention in which a sliding venturi is subject directly to the varying pressure differential under different rates of flow of the air.

Figure 23 is a detail view illustrating an application of the invention in which a constant pressure or vacuum is secured at the fuel inlet in connection with the use of a sliding venturi.

In the general view presented in Figure 1 of the drawings there is illustrated the application of the invention in one convenient and suitable embodiment of each of its several features, to a four-cylinder, internal combustion engine, of which the cylinders are indicated at $a$, with their spark plugs $b$ and common exhaust pipe $c$, which latter serves as a convenient source of heat. The air which, with the fuel, forms the explosive mixture, is conducted to the cylinders through an air and mixture supply-pipe $d$, with branches as at $d'$, for the several cylinders, a portion of the air being heated as it is taken in through a sleeve $d^2$, called a stove or heater, which surrounds the exhaust pipe $c$, and another portion, not heated, being admitted through a controllable valve $d^3$, which is regulated, according to the conditions of use of the engine, so as to give to the air, before the fuel is introduced the proper temperature. Means for automatically controlling the valve $d^3$ will be referred to hereinafter.

The fuel to be mixed with the air, which may be gasoline, is presumed, in the present instance, to be supplied under normal or atmospheric pressure, from any suitable source through a pipe $e$ which terminates in a nozzle $e'$, the flow of the gasoline being induced by the suction stroke of the engine. The fuel inlet may be of any suitable character. In the construction shown in Figure 1, and, in detail, in Figure 4, which is designed for use with an increasing vacuum at the fuel orifice, as distinguished from the construction shown, for example, in Figure 23, which is designed for use with a constant pressure at the fuel orifice, the fuel pipe $e$ is introduced horizontally into the vertical portion of the air and mixture supply pipe $d$, terminating in the vertical branch $e'$ with a head $e^2$, which has a coned or tapered face $e^3$. The bore of the vertical branch terminates in a chamber $e^4$ within the head and from such chamber radial channels $e^5$ conduct the fuel to the coned or tapered face. For the purpose of producing an atomizing action on the fuel air may be admitted through a pipe $e^6$, provided with a regulating screw $e^7$ for regulating the admission of air, to a chamber formed in the head, below the upper end of the branch $e'$, the air being admitted to the bore of the branch $e'$, so as to mix with the fuel, through channels $e^9$. If desired, for the purpose of aiding in the vaporization of the fuel, at the time of starting, the fuel may be heated in the inlet or nozzle itself by an electric heating coil $e^{10}$, around the branch $e'$, in a chamber formed by a jacket $e^{11}$ of low heat conductivity, so that all of the heating effect is confined to the fuel pipe $e'$.

If desired, the fuel may be heated before it is delivered to the inlet or nozzle and its temperature regulated or controlled or kept within the limits of which a thermostatic device is set, as, for example, by means as shown in Figure 1, in which a pipe $c'$, connected to the exhaust pipe $c$, conducts a portion of the hot gases of combustion (or, it might be, water from the jacket of the engine) through a coil $c^2$, in a vessel $e^{12}$ through which the fuel flows to the inlet. A valve $c^3$ in the pipe $c'$ controls the flow of the hot gases through the pipe $c'$ and may itself be controlled through a thermostatic device $e^{13}$, which is connected to an arm $c^4$ of the valve $c^3$. The thermostatic device may be of any suitable character, such, for example, as that to be described hereinafter.

The temperature of the mixture itself may also be regulated according to the conditions of use of the engine. As shown also in Figures 1 and 4, the pipe $d$ may be jacketed, as at $d^4$, and the hot gases of combustion or hot water may be conducted from the pipe $c'$ by a branch pipe $c^5$ to the jacketed space, the passage of the hot gases through the jacketed space being regulated by a valve $d^5$ in the outlet pipe $d^6$ while the valve itself is automatically controlled through an arm $d^7$ which is connected to the stem $d^8$ of a thermostatic device $d^9$ which is subject to the temperature of the mixture within the pipe $d$. The thermostatic device may be of any usual or suitable construction.

A throttle valve $d^x$ may be placed in the mixture pipe $d$ for the purpose of controlling the quantity of mixture supplied to the cylinders.

As a means for mixing the air and the fuel vapor and for regulating the proportions of both to suit the conditions of operation of the engine there is provided, in the embodiment of the invention shown in Figures 1 and 4, for cooperation with the fuel inlet head $e^2$, a Venturi tube $f$ which is moved longitudinally to change its relation to the inlet head and therefore to change the area of the passage surrounding the fuel orifice, through which variable area all of the air must pass and thereby, according to the calibration and adjustment of parts, either to maintain a constant pressure or an increasing vacuum as the speed of the engine increases, under the influence of which pressure or vacuum the proper amount of fuel is caused to flow. In this connection it will be understood that the area of the air passage may be varied, with changing conditions of operation, so as to maintain a constant pressure at the fuel orifice, when provision is made for a variation in the area of the fuel orifice or orifices, and that the area of such air passage may be so varied in proportion to the quantity of air flowing through the meter or measuring device under different conditions of operation so as to produce a variable pressure at the fuel orifice and thereby cause the proper amount of fuel to be supplied to give the mixture best suited for a given engine speed. In other words, for any given quantity of air passing through the meter or measuring device, the venturi will be moved to such a position that the pressure at the fuel orifice will be that which causes the proper amount of fuel to be supplied. The actuating means by which the movement of the venturi is effected under different conditions of engine operation will be hereinafter described.

Water or water vapor may be added to the explosive mixture according to atmospheric and other conditions under which the engine is operated and its admission may be controlled automatically in accordance with the requirements of the conditions of operation. Obviously such water or water vapor may be added either to the air before the mixture is formed or to the mixture itself, or to both, as shown in Figure 1. A water supply pipe $g$, coiled around the exhaust pipe $c$, as at $g'$, in order that the water may be heated, is provided with an automatically operated controlling valve, as at $g^2$, a nozzle $g^3$ in the supply pipe $d$ in advance of the formation of the mixture, and a nozzle $g^4$ in the pipe $d$ after the point of formation of the mixture, the nozzles $g^3$ and $g^4$ being controlled by hand-operated valves $g^5$ and $g^6$. The valve $g^2$ may be adjusted, if desired, so as to prevent the admission of water at all speeds below a predetermined minimum and the valves $g^5$ and $g^6$ serve for initial adjustment according to the requirement of the particular engine with which the invention is employed.

The igniting circuits $b^1$ for the several igniting devices $b$, are controlled, for the purpose of timing the ignition in the several cylinders, through a timing device or distributer $b^2$ which may be of ordinary character and may be operated, to change the period of ignition, both by hand and automatically, in accordance with the varying conditions under which the engine is operated. For hand operation the distributer or timing device is provided with an arm $b^3$ connected to a rod $b^4$ which is guided in a fixed guide $b^5$ and has a collar $b^6$ against which the end of the hand-operating rod $b^7$ may bear, a spring $b^8$ abutting against the collar $b^6$ to return the timing device to normal position.

As already explained, the main body of air which enters the supply pipe $d$ is, in the construction shown in Figure 1, heated in the heater $d^2$ and is attemperated by the admission of cold air through the controllable valve $d^3$. This valve is preferably controlled automatically by the temperature of the air in the pipe after the admixture of the cold air with the heated air and for this purpose a thermostatic device $h$ is applied to the tube $d$ at some distance beyond the valve $d^3$ and is operatively connected to the valve $d^3$, which is of the rotary shutter type, so that variations in the temperature of the air within the tube in the vicinity of the thermostatic device $h$ will shift the valve so as to admit more or less cold air as may be required. Any thermostatic device suitable for the purpose may be employed. One such form of thermostatic device, of a well known construction, is shown somewhat in detail in Figure 3, comprising an outer shell or casing $h'$ which is secured to the tube $d$ and communicates therewith, an expansible sealed container $h^2$, filled with a readily expansible fluid and fixed at one end to the casing $h'$ in such manner as to permit it to be freely exposed to the temperature of the air within the tube $d$, while its other end is free to move with the expansion and contraction of the container, and a stem $h^3$ which passes through a suitable stuffing-box $h^4$ on the end of the casing $h'$. The stem $h^3$ is shown in Figure 1 to be operatively connected with the valve $d^3$ through a bell-crank lever $h^5$, a link $h^6$ and an arm $h^7$ of the valve, so that expansions and contractions of the container $h^2$, under varying conditions of temperature, produce a corresponding opening or closing of the valve $d^3$. Other thermostatic devices hereinbefore and hereinafter referred to may be of the same general construction as the thermostatic device $h$ just described and therefore no further description of such other thermostatic devices will be necessary.

It has already been stated that a part of the energy of the air or of the mixture which flows through the tube $d$ under the influence of the engine suction, is utilized, through suitable actuating means, to control the mixture and to perform other functions as well in accordance with the varying conditions under which the engine is operated, and primarily to insure a supply of fuel in proportion to the measured volume of the air. One form of means suitable for the accomplishment of this part of the invention is illustrated in Figure 1 and as adapted for the control of the movement of the sliding Venturi tube $f$, hereinafter referred to, whereby the pressure at the nozzle is controlled to regulate the flow of the fuel and the proper mixture of the air and fuel assured. In the construction thus illustrated the tube $d$ is formed or provided with a Venturi meter, the throat of which is indicated at $d^{10}$ and the inlet at $d^{11}$. Under the well known laws which govern the action of a venturi the difference between the pressures at the throat and inlet vary with variations of flow of the fluid through the venturi and therefore with the volume of the fluid which flows through the venturi in a unit of time. In this instance the actuator which is subject to and actuated by the variations in pressure, is shown as a fluid pressure device $k$ of ordinary construction, comprising, as shown in detail in Figure 2, a two-part shell or casing $k'$, $k^2$, an interposed, flexible diaphragm $k^3$, which divides the space within the shell into two chambers, and a stem $k^4$ which is connected to the diaphragm $k^3$ and is extended through a suitable stuffing-box in one part of the casing, one of the chambers being connected, as by a pipe $k^5$ with the inlet $d^{11}$ of the venturi, and the other being connected, as by a pipe $k^6$, with the throat of the venturi, so that the diaphragm $k^3$ is subject on opposite sides to the pressures at the inlet and throat of the venturi and moves with the variations in the difference of such pressures. A yielding, adjustable resistance may be provided by applying a spiral spring $k^7$ to the stem $k^4$ between the shell $k'$ and an adjustable collar $k^8$. Operative connections between the actuator $k$ and the sliding Venturi tube $f$ are provided, in the construction shown, by a lever $f'$, and a link $f^2$, this lever being also common to other controlling devices to be referred to.

To accommodate the changes in conditions of operation which take place with changes in barometric conditions, particularly with changes in altitude, by reason of which the ratio by weight of the fuel to the oxygen in the air varies, it is desirable to cause changes in barometric conditions to modify the control of the mixture through the quantity of air as already explained. For this purpose an ordinary barometric device $m$, which may be constructed substantially like the pressure device $k$, may be provided and have its diaphragm connected by a stem $m'$ with the lever $f'$ before referred to, so that the varying pressure of the atmosphere, acting in conjunction with the yielding resistance $k^7$, shall influence the movements of the sliding venturi $f$ or other mixing device and thus control the mixture.

As in starting the engine and for a time thereafter, even in normal weather, and perhaps continuously in extremely cold weather, the temperature of the incoming air will be somewhat lower than normal or that for which the apparatus is adjusted, the weight of oxygen per unit volume of air will be greater than at normal temperature. For the purpose of compensating for such variation provision is made whereby the fuel-supply may be modified according to variations in the temperature of the air. To this end, there may be provided, as shown in Figure 1, a thermostatic device $n$ preferably connected to the tube $d$ in the vicinity of the Venturi meter $d^{10}$, $d^{11}$ and having its stem $n'$ connected, through the tension spring $n^2$, to the lever $f'$, above referred to, whereby variations in the temperature within the tube $d$ will vary more or less the tension of the spring $n^2$ and thereby influence the movement of the Venturi tube $f$ and control the proportions of the mixture. When the incoming air is at or near the normal temperature for which the apparatus is adjusted, the thermostatic device will have its maximum expansion and the spring $n^2$ will be under no tension, but when the temperature of the incoming air falls to a predetermined minimum, the tension of the spring will be gradually increased as the temperature of the air falls below such predetermined minimum. Therefore, under all temperature conditions above the predetermined minimum the lever $f'$ and its connections are actuated independently of the thermostatic device $n$, while at all temperatures below such predetermined minimum the movements of the lever $f$ and its connections are modified by the thermostatic device $n$.

For varying the amount of water vapor in the mixture, to secure economical operation of the engine under varying conditions of moisture in the atmosphere, usually represented by barometric conditions, the admission of water to the mixture may be controlled by and with the varying barometric conditions, by connecting the stem $k^4$ through an arm $g^8$ with the valve $g^2$. As already described, the barometric device $m$ is operatively connected, through the stem $m'$ and the lever $f'$ with the stem $k^4$ and therefore with the arm $g^8$ and therefore influences and controls the admission of water.

The timing of ignition in the several cylinders of an internal combustion engine, so as to secure the maximum efficiency must be varied under varying conditions of speed and charge and therefore with the volume of the charge or of the air which enters into the combustion of the charge and flows through the supply tube in a unit of time. To enable this result to be produced automatically and the timing of ignition to be varied with the volume of air or mixture passing in a unit of time, operative connections are provided between the movable member of the mixing device, such as the sliding venturi $f$, or the actuating devices which control its movements and the timer or distributer $f^2$. In the construction shown in Figure 1, the lever $f'$ is extended and is connected through a link $b^9$ and a slip joint $b^{10}$ with an arm $b^{11}$ of the timer. The connections between the timer on the one hand and its automatic operating devices and its manually controlled operating devices on the other hand are such as to permit the movement of the timer by either set of operating devices without disturbing the other.

It will be understood, of course, that the various automatic controlling devices herein referred to and their connections are provided with suitable adjusting means, not necessary to be shown herein and that all of such devices and their connections are properly adjusted and calibrated to suit the requirements of the engine with which they are used.

It will also be understood that various forms of actuating or controlling devices may be used to accomplish the desired results according to the requirements of each particular case. Some of such alternative devices will now be described.

In Figure 5 a cylinder $k^{10}$, connected at its ends with the inlet $d^{11}$ and throat $d^{10}$ of the Venturi meter or measuring device in the tube $d$ by suitable pipes $k^6$ and $k^5$, and its piston $k^{11}$, are shown as a substitute for the diaphragm type of pressure device $k$ shown in Figures 1 and 2. The piston rod $k^{12}$ is adjustably connected with a lever $k^{13}$ which is provided with an adjustable fulcrum $k^{14}$ and is adjustably connected at the other end with a link $k^{15}$, which is connected with the sliding venturi $f$. As shown, the lever $k^{13}$ is slotted longitudinally to receive the fulcrum pin $k^{14}$, carried by a slotted bracket secured adjustably on the frame of the engine.

In Figures 6, 7 and 8 a rotary valve is shown as an alternative for the sliding venturi form of pressure regulating device shown in Figures 1, 4 and 5. As shown, the tube $d$ is provided at $f^3$ with a cylindrical valve seat which receives a cylindrical valve which is composed of a shell $f^4$ and a body $f^5$, rotarily adjustable, the one with respect to the other, so as to displace relatively the obliquely disposed ports $f^6$, $f^7$ to vary the area of the passage through the valve for initial setting according to the engine characteristics. This compound valve is provided with an arm $f^8$ which is connected by a link $f^9$ with the actuating devices. A fuel supply pipe $e$ terminates, within the tube $d$, in a suitable nozzle $e^{15}$ which is placed in proximity to the valve. The nozzle $e^{15}$ preferably has as a fuel orifice a long slit rather than a plurality of separate openings, since thereby, in conjunction with the obliquely disposed ports, a more regular and steady variation in the supply of fuel is secured.

In Figures 9 and 10 a sliding valve $f^{10}$, having a tapered port $f^{11}$ is shown as disposed transversely in the tube $d$, in proximity to the fuel nozzle $e^{15}$ and is connected through a bell-crank lever $f^{12}$ and a link $f^{13}$ with the actuating mechanism.

In Figure 11 the tube $d$ is shown as provided with two fixed venturis $d^{12}$ and $d^{13}$ and with a choke valve $f^{14}$ between the two. The fuel pipe $e$ terminates in a nozzle $e^{16}$ suitably placed with reference to the throat of the venturi $d^{13}$ and provided with a tapered fuel orifice and with a sliding fuel orifice controlling sleeve $d^{17}$ which has a port $d^{17x}$. The tapered orifice may be tapered downwardly, as shown at $d^{18}$ in Figure 14, or upwardly as shown at $d^{19}$ in Figure 15 according to the calibration and adjustment of parts to give a constant pressure of air at the fuel orifice or an increasing vacuum. The sleeve is operatively connected with the choke valve $f^{14}$, so as to be movable therewith as by a link $d^{20}$. With the downwardly tapered orifice $d^{18}$, the increased volume of air admitted at constant pressure by wider opening of the choke valve $f^{14}$ produces a corresponding increase in the quantity of fuel delivered by reason of the uncovering of a wider portion of the fuel orifice $d^{18}$ by the port $d^{17x}$ as the sleeve $d^{17}$ moves upward while if the the parts are calibrated and adjusted so as to permit an increasing vacuum about the fuel orifice as the choke valve $f^{14}$ is opened more widely, the area of the upwardly tapered orifice $d^{19}$ in Figure 15 exposed by the port $d^{17x}$ in the upward movement of the sleeve $d^{17}$ will be gradually reduced, so that the proper relative quantity of fuel will continue to be supplied under the changing conditions. The valve itself may be connected, as by an arm $f^{15}$ and link $f^{16}$, with a lever $f^{17}$ which is itself directly connected with the pressure controlled actuator $k^{16}$, which is here shown as of the diaphragm type and as having its chambers, above and below the diaphragm, connected by pipes $k^{17}$ and $k^{18}$ respectively with the inlet and throat of the venturi $d^{12}$. This arrangement gives a richer mixture for an instant on the opening movement of the throttle $d^x$ before the actuating mechanism takes control, because of the lag in the action of the differential pressure devices. This is true in all the constructions shown.

In Figure 12 the tube $d$ is shown as provided with a coiled pipe heater $d^{4x}$, by which the mixture may be heated, substantially as already described with respect to Figure 1, although the coiled pipe heater may be preferable to the jacket heater for some kinds of fuel. The pipe $d$ is also shown as formed with two venturis $d^{12}$ and $d^{13}$ and as provided with a fuel inlet $e^{17}$ and a choke valve $f^{14}$, substantially as in Figure 11. The valve $f^{14}$ is connected through an arm $f^{15}$ with a diaphragm pressure device $k^{16}$ the chambers of which are connected, through pipes $k^{17}$ and $k^{18}$, with the throats of the two venturis, the pressure device being thereby actuated by the difference in pressures of the air before the mixture is formed and of the mixture itself after it is formed.

In Figure 13 also the tube $d$ is shown as provided with two venturis $d^{12}$ and $d^{13}$, a fuel-inlet $e^{17}$ and a choke valve $f^{14}$ arranged substantially as shown in Figure 12. The choke valve $f^{14}$ is operatively connected, through a link $f^{16}$, with a lever $f^{18}$, fulcrumed at $f^{19}$ and subject to the action of two diaphragm pressure devices $k^{19}$ and $k^{20}$. These pressure devices are connected respectively, through suitable pipes as shown, with the inlet and throat of the respective venturis $d^{12}$ and $d^{13}$. Each of the pressure devices is therefore actuated by the differential of pressures in the inlet and throat of the corresponding venturi and the valve $f^{14}$ is actuated by the algebraic sum of the action of the two pressure devices.

In Figure 16 the tube is shown as provided with a sliding venturi $f$ and fuel-inlet $e'$, the sliding venturi being operatively connected with cylinder-and-piston pressure device $k^{10}$, $k^{11}$, such as is shown in Figure 5, but the two ends of the cylinder $k^{10}$ are connected, through suitable pipes, with the inlet and throat respectively of a venturi $d^{21}$, the mixture being thus controlled by the difference of pressures on the mixture, at the inlet and throat of the venturi, and therefore by the volume of the mixture as it flows through the venturi.

Figure 16ª shows a transverse slide valve $f^{10}$ and fuel-inlet $e^{15}$, substantially as shown in Figure 9, arranged beyond the throat of a venturi $d^{22}$, the valve being connected by a link and bell-crank $f^{12}$ to a piston $k^{10}$ in a cylinder $k^{11}$, which is connected at one end by a suitable pipe to the throat of the venturi $d^{22}$ and is open to atmospheric pressure at the other end, a spring $k^{21}$ being applied to the stem of the piston to furnish a yielding resistance to atmospheric pressure exerted against one face of the piston. The other face of the piston is subject to the varying pressure in the throat of the venturi and the piston therefore responds to variations in volume of the air which passes through the venturi.

In the construction shown in Figure 17 a pressure regulating valve of the sliding venture type $f$ is arranged to cooperate with a fuel-inlet $e'$ as in the construction shown in Figure 1 and the sliding venturi is connected through a link $f^{20}$, bell-crank $f^{21}$ and link $f^{22}$ with a centrifugal governor $f^{23}$ on the shaft $f^{24}$ of a fan located in the tube $d$ at $f^{25}$. The speed of rotation of the shaft varies with the speed and therefore volume of air which passes through the tube $d$ and controls the mixture through the sliding venturi.

In the construction shown in Figure 18 a cylinder $k^{10}$ is connected at one end to the interior of the tube $d$ through a pipe $k^{22}$, which opens against the flow of air through the tube while the other end of the piston is connected to the interior of the tube $d$ through a pipe $k^{23}$ which opens into the tube in a direction at right angles to the axis of the tube. The piston $k^{11}$ is therefore subject on one face to the impact pressure of the air in the tube $d$ and on the other side to the static pressure and as the difference between the impact pressure and the static pressure varies with the square of the rate of flow or velocity and therefore with changes in the volume of air which passes through the tube in a unit of time, the piston responds to variations in the volume and constitutes a measuring device. The piston $k^{11}$ in this instance is connected through its stem $k^{24}$, bell-crank $f^{21}$ and link $f^{22}$, as in the construction shown in Figure 17, to a sliding venturi $f$.

Reference has been made herein to a yielding resistance, such as the spring $k^7$ shown in Figure 1, and it is obvious that such a yielding resistance might be afforded by other means than by the spring shown. Thus in Figure 19 the piston $k^{11}$, within the cylinder $k^{10}$, is shown as connected by a link $k^{25}$ to the horizontal arm of a bell-crank $k^{26}$, the other arm, normally vertical or nearly so, having a weight $k^{27}$ which is swung by the downward movement of the piston $k^{11}$ toward the horizontal position with respect to the fulcrum of the bell-crank, the yielding resistance thus afforded by the raising of the weight being increased as the weight approaches the horizontal plane of the fulcrum. In Figure 20 the piston $k^{11}$ is shown as connected by a lever $k^{28}$ with a piston $k^{29}$ in a cylinder $k^{30}$, the piston having a port $k^{31}$ which is entered by a tapered pin $k^{32}$ as the piston $k^{29}$ moves upward, a yielding and gradually increasing resistance being thus opposed to the downward movement of the piston $k^{11}$. Obviously the degree of resistance may be adjusted in the one case by changing the weight $k^{27}$ and in the other case by positioning the tapered pin $k^{32}$.

In the several embodiments of the invention thus far referred to it has been assumed that the fuel is supplied under normal or atmospheric pressure, but the invention is no less capable of application when the fuel is supplied under pressure, as will be readily understood by reference to the embodiment of the invention which is illustrated in Figure 21. In this construction the fuel, either gaseous or liquid, is assumed to be supplied under pressure from any suitable source through a pipe $e^{16}$ from which it is delivered to an adjustable automatic pressure reducing and regulating valve $e^{18}$. The fuel, under a pressure controlled by the volume of air flowing through the tube $d$, is delivered from the valve $e^{18}$ to a fuel orifice $e^{20}$ of a constant size. The quantity of fuel flowing through such orifice will vary substantially as the square root of the pressure of the fuel at the orifice. This pressure, regulated through the valve $e^{18}$, will vary with the variations in pressure difference which act on the diaphragm pressure device $h^{33}$. The quantity of air which flows through the tube $d$ varies substantially as the square root of this pressure difference and therefore a constant ratio of the fuel to air will be maintained. If the throttle is suddenly closed, when the engine is running at high speed, the pressure on the fuel in the pipe between the valve $e^{18}$ and the orifice $e^{20}$ would force nearly all of the fuel through the orifice and waste it and to prevent this there is provided a quick opening and closing valve $e^{19}$, close to the fuel orifice, which is operatively connected with the throttle $d^x$, so as to be actuated therewith. It opens instantly for the passage of fuel on the initial movement of the throttle from its closed position and remains wide open until the throttle is again closed completely. For effecting the control of the valve $e^{18}$ by the pressure device $h^{33}$, which is connected on one side to the inlet of the venturi and on the other side to the throat of the venturi, its diaphragm is operatively connected through a lever $h^{34}$ with a stem $h^{35}$ arranged to bear against the under side of the diaphragm $e^{22}$ which carries the tapered valve plug $e^{17}$, yielding resistance being afforded by a spring $h^{36}$. Variations in volume of the air passing through the tube $d$ expressed by variations in the pressure difference at the inlet and throat of the venturi measuring device, acting through the pressure device or actuator $h^{33}$, vary the pressure upon under side of the diaphragm $e^{22}$ against the resistance of the spring $h^{36}$ and so regulate the pressure of the fuel on the outlet side of the pressure reducing regulating valve $e^{18}$ and therefore on the fuel orifice at $e^{20}$.

In the embodiment of the invention illustrated in Figure 22 the varying pressure differential is made to act directly upon the sliding venturi or upon parts which are directly connected therewith rather than through separate transmitting devices. The tube $d$ has a cylindrical portion at $d^{25}$ of a relatively large diameter and a cylindrical portion $d^{26}$ of a relatively smaller diameter, with an intermediate section $d^{27}$ which has a cylindrical portion $d^{28}$ of relatively large diameter, larger than the portion $d^{25}$, and another cylindrical portion $d^{29}$ of smaller diameter than the portion $d^{28}$ and preferably of the same diameter as the cylindrical portions $d^{25}$. The sliding venturi $f$ has a cylindrical body $f^{25}$ which has a sliding fit in the cylindrical portions $d^{25}$ and $d^{29}$ and has an annular piston surface $f^{26}$ exposed in the chamber $d^{30}$. A circular web $f^{28}$, secured to the body of the sliding venturi, preferably to the cylindrical portion $f^{25}$, has a sliding fit within the cylindrical portion $d^{28}$ separating the upper portion $d^{31}$ of the internal chamber from the lower portion $d^{32}$ thereof. The chamber $d^{30}$ communicates with the atmosphere through an adjustable inlet or outlet $d^{33}$. The chamber $d^{31}$ and $d^{32}$ is connected through pipes $d^{34}$ and $d^{35}$ with the interior of the inlet pipe in such manner that the pressures which vary with the rate of flow of the air are transmitted to and exerted upon the upper and lower faces of the piston flange $f^{28}$, the pipe $d^{34}$ being connected, for example, to the throat of a fixed venturi, as in Figure 1, or to a static inlet as in Figure 18, while the pipe $d^{35}$ is connected, for example, to the inlet of the venturi as in Figure 1, or to an impact inlet as in Figure 18. A port $f^{27}$ is formed in the upper part of the sliding venturi so as to establish communication between the chamber $d^{30}$ and the engine while the engine is running at slow speed, as in starting, such port being lapped by the cylindrical portion $d^{26}$ and such communication cut off when the engine has acquired speed and the suction is greater. In starting, the suction of the engine exerted through the port $f^{27}$ upon the piston face $f^{26}$ thus assists in raising the venturi when the pressure difference in the pipes $d^{34}$ and $d^{35}$ is not great enough to raise the venturi or control its position. After the engine has started, the pressure differential exerted through the pipes $d^{34}$ and $d^{35}$ upon the upper and lower faces of the annular piston $f^{28}$ is sufficient to control the position of the sliding venturi with respect to the fuel orifices as shown in Figure 23. The adjustable vent valve $d^{33}$ permits atmospheric pressure to be established within the chamber $d^{30}$ which, with the piston face $f^{26}$, constitutes a dashpot with a variable resistance which is adjustable for engine characteristics.

In the embodiment of the invention illustrated in Figure 23, the fuel inlet is of the same general character as that shown in Figure 4, but is specially designed for use when the venturi and its connections are calibrated and adjusted for a constant pressure at the fuel orifice, as distinguished from the construction shown in Figure 4 which, as already explained is specially designed for a gradually increasing vacuum at the fuel orifice. The fuel from any suitable source is supplied through a pipe $e$ to a chamber $e^{30}$, closed at its lower end by a plug $e^{31}$ removable to give access, for purposes of adjustment, to the head of a rod $e^{32}$ which is threaded at its upper end $e^{33}$, in a spider $e^{34}$, carried by the sliding venturi $f$. The rod is provided at it lower end with a piston head $e^{35}$, which does not fill the bore of the chamber $e^{30}$, and the rod has in its surface one or more grooves $e^{36}$ of varying cross-section and uniform depth or of uniform cross-section and varying depth. The rod has a sliding fit in the neck $e^{37}$ above the chamber $e^{30}$ and in the upper part of the fuel nozzle hereinafter referred to, the grooves of the rod and the neck $e^{37}$ forming a fuel metering valve. Above the chamber $e^{30}$ is a sleeve $e^{38}$ which forms a heating chamber $e^{39}$ which may be provided with an electric heating coil $e^{40}$, as in the construction shown in Figure 4. A tube $e^{41}$ loosely surrounds the rod $e^{32}$ and conducts the fuel which passes the metering valve $e^{37}$ upward to the chamber $e^{42}$ of the main body $e^{43}$ of the fuel nozzle. A secondary portion $e^{44}$ is threaded into the main body portion $e^{43}$ so as to form between the two portions an annular fuel orifice $e^{45}$, the internally coned face of the portion of the body $e^{43}$ being preferably provided with an annular lip $e^{46}$ near its periphery to form the fuel nozzle. Channels $e^{47}$ conduct the fuel from the chamber $e^{42}$ to the fuel orifice and a set screw $e^{48}$ may be provided to retain the adjustable portion $e^{44}$ of the fuel nozzle in adjusted position. By adjustment of the rod or spindle $e^{32}$ the initial cross-sectional area of the channel or channels through which the fuel is permitted to pass the neck $e^{37}$, through the groves $e^{36}$, may be determined. Thereafter, as the venturi rises with an increase in suction, increasing the area of the annulus through which the air passes, the rod or spindle $e^{32}$ rises with it and produces a corresponding variation in the area of the fuel channel or channels afforded by the groove or grooves $e^{36}$, allowing an increased amount of the fuel to flow to the orifice $e^{45}$, the channels, or grooves $e^{36}$ being calibrated with the venturi to give the desired fuel flow for all volumes of air. As shown, the groove $e^{36}$ may be enlarged at its upper end so as to give a rich mixture in the starting position. It will be understood that below this point the grooves may be of uniformly increasing taper or of variably increasing taper. As the venturi rises the area of the annulus through which the air passes increases, but as the pressure remains constant the air velocity also remains constant, and the proportions are such that this is the point of highest velocity of the air passing to the engine, whereby a practically perfect mixture of the air and fuel will be produced and maintained.

The piston head $e^{35}$ at the lower end of the rod or spindle $e^{32}$ acts, if the throttle should be opened suddenly and the venturi should rise with corresponding suddenness, to force a larger quantity of fuel up through the neck $e^{37}$ and through the fuel orifice $e^{45}$, thereby giving a richer mixture and causing the engine to respond immediately with good acceleration. The piston head also acts as a dashpot to prevent fluttering of the venturi.

Many other alternatives for particular devices referred to herein will readily suggest themselves and it will be understood that the invention, so far as it is expressed as a method or steps of a method, is not limited to its embodiment in any particular mechanical device or set of mechanical devices and that, so far as it is expressed in terms of construction, is not limited to the employment of the particular devices shown and described herein or any of them, either singly or in combination, but may be embodied in any of such mechanical devices or combinations of devices or any other known equivalents. It will also be understood that while many specific embodiments of the invention are shown and described herein and some of the claims may be limited to one of such specific embodiments, it is not intended thereby to dedicate to the public any of such embodiments which may not be covered by such specific claims, it being the intention to claim such other specific embodiments of the invention in other applications.

I claim as my invention:

1. Apparatus for controlling the fuel-supply for an internal combustion engine, comprising a supply pipe provided with connections for the supply of air and fuel, measuring devices responsive to variations in the velocity of flow through the supply pipe, and means to control the supply of fuel in operative relation with the measuring devices.

2. Apparatus for controlling the fuel-supply for an internal combustion engine, comprising a supply pipe provided with connections for the supply of air and fuel, an actuating device movable with the difference in pressure at two points of the flow through the pipe, and means in operative relation with the actuating device to control the supply of fuel.

3. Apparatus for controlling the fuel-supply for an internal combustion engine, comprising a supply pipe provided with connections for the supply of air and fuel, a Venturi measuring device interposed in the supply pipe, a movable diaphragm subject on opposite sides to the pressure at the inlet and at the throat of the venturi, and means in operative relation with the diaphragm to control the supply of fuel.

4. Apparatus for controlling the fuel supply of an internal combustion engine, comprising a supply pipe provided with independent connections for the supply of air and fuel, a differential pressure device in connection with the supply pipe, a movable member operated by the differential pressure device, and means in operative relation with said movable member to control the supply of fuel.

5. Apparatus for controlling the fuel-supply for an internal combustion engine, comprising a supply pipe provided with connections for the supply of air and fuel, means for introducing water within the pipe, devices for controlling the introduction of water, and a mechanical device movable with variations of pressure within the pipe and operatively connected with said controlling devices.

6. Apparatus for controlling the fuel-supply for an internal combustion engine, comprising a supply pipe provided with connections for the supply of air and fuel, means for introducing water within the pipe, devices for controlling the introduction of water, and a mechanical device movable with variations in atmospheric pressure and operatively connected with said controlling devices.

7. Apparatus for controlling the fuel-supply for an internal combustion engine, comprising a supply pipe provided with connections for the supply of air and fuel, means for adding water to the mixture within the pipe, devices for controlling the admission of water, and a thermostatic device subject to the variations of temperature within the pipe and operatively connected to said controlling devices.

8. Apparatus for controlling an internal combustion engine, comprising a supply pipe provided with connections for the supply of air and fuel, igniting devices, a timing device for controlling the time of ignition, and a thermostatic device movable with variations of temperature within the pipe, and operatively connected to the timing device to vary the time of ignition.

9. Apparatus for controlling the fuel-supply for an internal combustion engine, comprising a supply pipe provided with connections for the supply of air, means for supplying fuel to the air in the supply pipe, regulating means for controlling the rate of supply of the fuel, a controlling member subject to variations in the pressure difference developed at separated points in the supply pipe, and operative connections between said member and said regulating means whereby the supply of fuel is varied in proportion to the variations in the rate of flow of air through the supply pipe.

10. Apparatus for controlling the fuel-supply for an internal combustion engine, comprising a supply pipe provided with connections for the supply of air and including a venturi, means for supplying fuel to the air in the supply pipe, regulating means for controlling the rate of supply of the fuel, a controlling member subject to variations in the pressure difference developed at the throat and inlet of the venturi, and operative connections between said member and said regulating means, whereby the supply of fuel is varied in proportion to the variations in the rate of flow of air through the supply pipe.

11. Apparatus for controlling the fuel-supply for an internal combustion engine, comprising a supply pipe provided with connections for the supply of air and fuel, regulating means for controlling the rate of supply of the fuel, differential pressure actuating means controlled by the pressure difference developed by the flowing air, and operative connections between said actuating means and said regulating means, whereby, for varied rates of flow of air, a fixed ratio between the rate of supply of fuel and the rate of flow of air is maintained.

12. Apparatus for controlling the fuel-supply for an internal combustion engine, comprising a supply pipe provided with connections for the supply of air and fuel, a fuel orifice for the discharge of fuel, a pressure regulating valve cooperating with the fuel orifice to regulate the flow of fuel therefrom, differential pressure actuating means controlled by a pressure difference developed by the flowing air at separated points, and operative connections between said means and said pressure regulating valve.

This specification signed this 24th day of February, A. D. 1917.

RUDOLPH RIEGE.